March 23, 1943.  L. A. M. PHELAN  2,314,598
INSULATED FREEZER SHELL AND TRANSMISSION
Filed Aug. 11, 1941  3 Sheets-Sheet 1

INVENTOR.
LOUIS A. M. PHELAN
BY  A.S.Krob
ATTORNEY

March 23, 1943.  L. A. M. PHELAN  2,314,598
INSULATED FREEZER SHELL AND TRANSMISSION
Filed Aug. 11, 1941  3 Sheets-Sheet 2
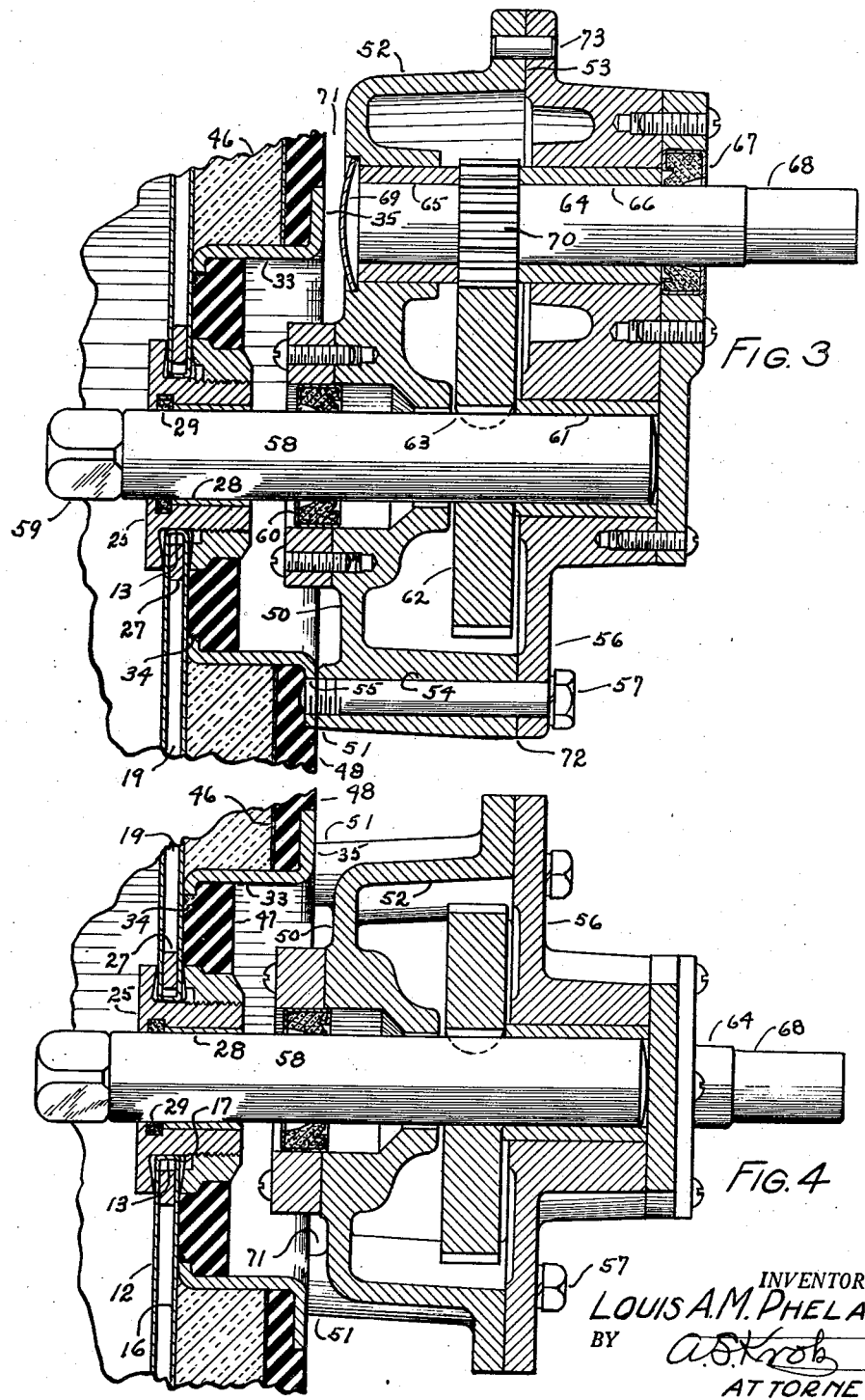
INVENTOR.
LOUIS A.M. PHELAN
BY
ATTORNEY

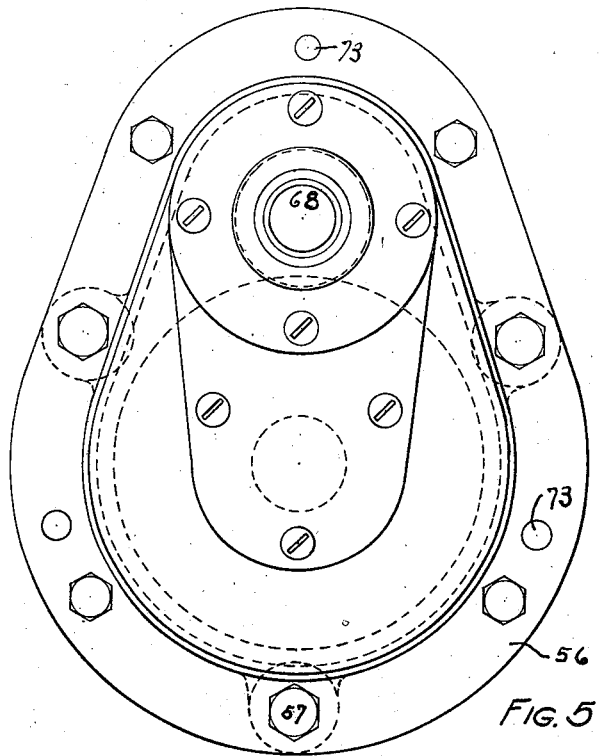
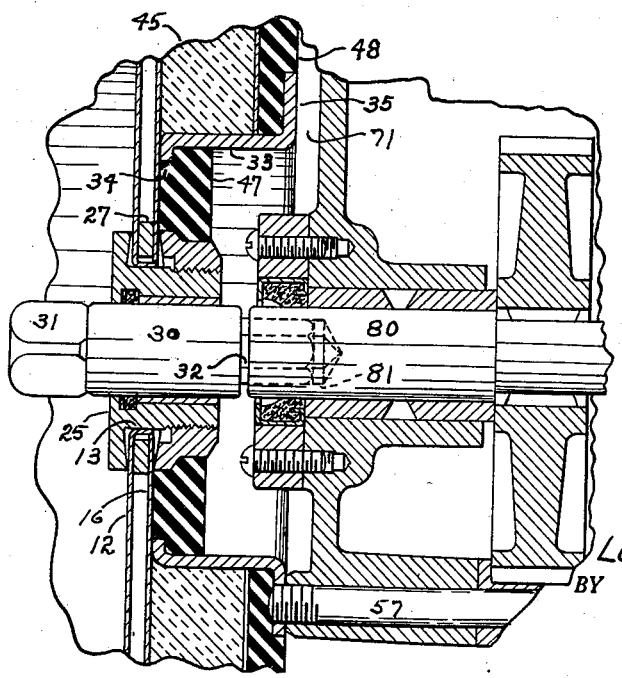

Patented Mar. 23, 1943

2,314,598

UNITED STATES PATENT OFFICE 2,314,598

INSULATED FREEZER SHELL AND TRANSMISSION

Louis A. M. Phelan, Rockton, Ill.

Application August 11, 1941, Serial No. 406,303

6 Claims. (Cl. 62—114)

Generally stated, the objects of the present invention are to provide a freezer shell which includes the evaporator circuit, means for insulating the shell and a transmission for driving the mixing rotor.

An object of the present invention is to provide a counter freezer shell which is surrounded by heat insulating material except at its open end and a transmission which is secured to the shell in a manner whereby an adapter shaft forms a connection between the transmission and rotor and a minimum amount of contact is made with the metal part of the shell in order to reduce the heat transfer contact with the transmission housing.

A further object of the present invention is to provide a mounting for the transmission which is self aligning and which provides a narrow opening between the shell and the housing of the transmission for the escape of any leakage that might occur from the shell or from the transmission.

An important object of the present invention is to provide a freezer shell having a tubular housing and means whereby the ends of the housing may be sealed to the shell by means of asphaltum or the like providing a space between the shell and housing and the sealing means for the reception of dry heat insulating material.

An object of the present invention is to provide means whereby either a single shaft may be used for transmitting power from the transmission to the rotor or a separate adapter shaft may be used so the transmission may be removed without removing the adapter shaft which extends to the rotor of the freezer.

It is an object of the present invention to provide a simple easily manufactured transmission which may have single or double reduction gearing thus to make possible the use of electric motors for driving the mixing rotor at the desired speed.

To these and other useful ends, my invention consists of parts, combinations of parts, or their equivalents, and mode of operation, as hereinafter set forth and claimed and shown in the accompanying drawings in which:

Fig. 3 is a longitudinal sectional view of a single reduction transmission making use of a single shaft forming an operating connection between the gears and rotor showing a fraction of the counter freezer shell in section.

Fig. 4 is a view similar to Figure 3 but taken on a line transverse to this figure.

Fig. 5 is an end view of the transmission shown in Figures 3 and 4.

Fig. 6 is a longitudinal fractional section of a modification showing a fraction of the shell.

In the present invention, the chamber may be similar to that shown in my copending application for patent Serial Number 338,841, filed June 5, 1940 now issued Patent No. 2,262,590, November 11, 1941.

Figure 1:
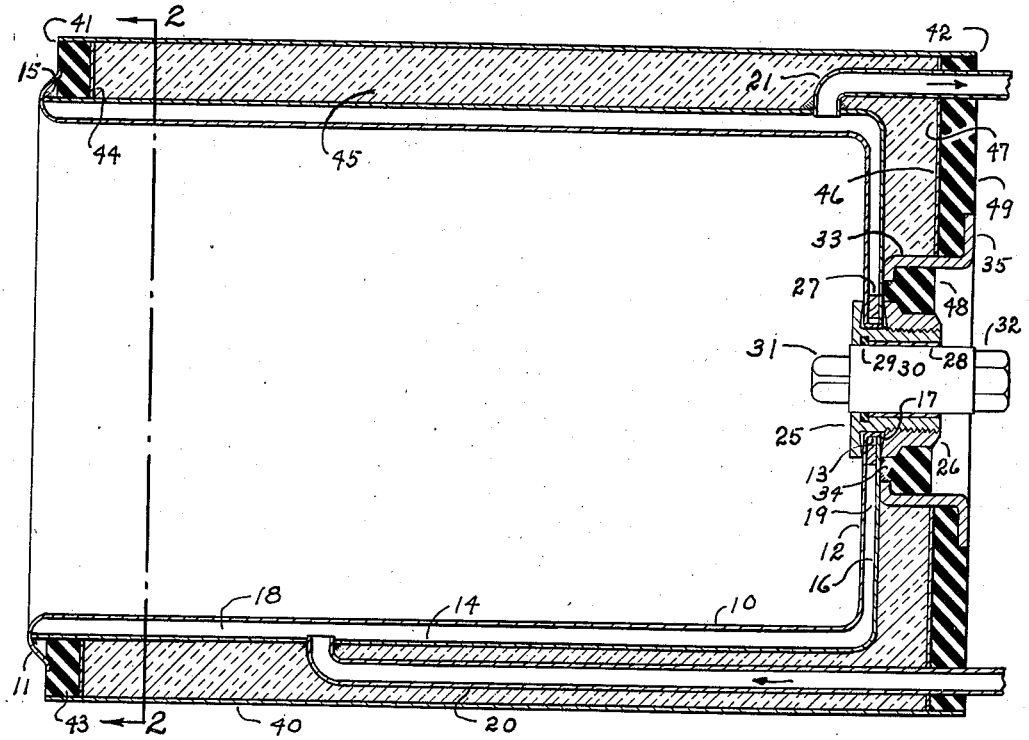
Fig. 1 is a longitudinal sectional view through my improved freezer shell.
Figure 2:
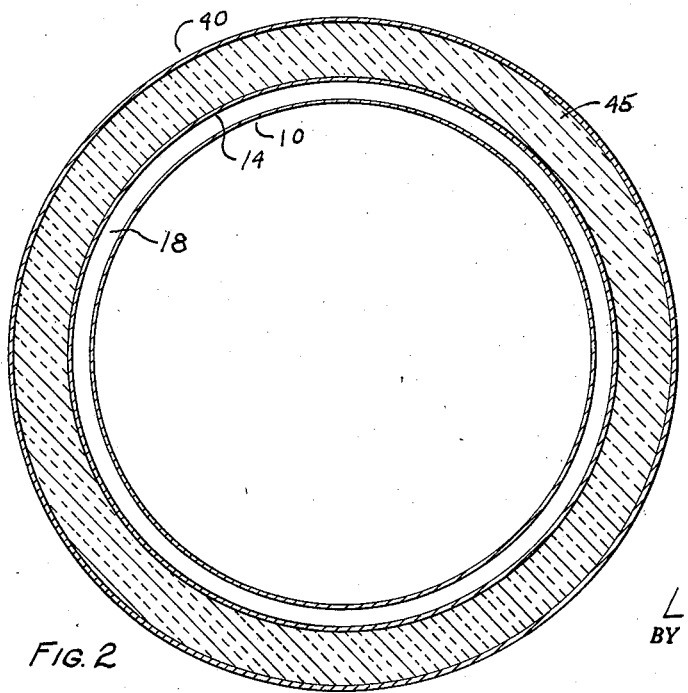
Fig. 2 is a transverse sectional view taken on line 2—2 of Figure 1.

As thus illustrated, the shell comprises an inner chamber 10 having at its open end an outwardly extending flange 11 shaped as shown in Figure 1 and a rear wall 12 having preferably an outwardly extending flange 13.

I provide an outer cylinder 14, the open end of which is welded to member 11 as at 15. Cylinder 14 is provided with a rear wall 16 which is spaced a short distance away from member 12 and having an aperture adapted to fit over flange 13, the contacting parts being welded together as at 17, thus to provide an annular chamber 18 and an end chamber 19. Members 18 and 19 are suitably prepared for the passage therethrough of refrigerant by means of inlet and outlet pipes 20 and 21.

I provide a flanged sleeve 25 which fits snugly in the opening formed by flange 13 and having a flanged nut 26, the nut and sleeve being screw threaded whereby the flanges of the nut and sleeve may be caused to tightly embrace walls 12 and 16. The flanges of these members are cut to a point so a leak proof joint is made between the flanges and members 12 and 16.

In order to form a substantial spacing means, I provide an annular ring 27. Member 25 is provided with a bearing sleeve 28 and a groove 29 for the reception of packing material.

In Figure 1, I illustrate an adapter shaft 30, the inner end being squared as at 31 with which to make an operating connection with the mixing rotor and a hexagon end 32 adapted to extend into an opening in the transmission shaft.

I provide an annular bracket 33, the under flange of which is welded to member 16 as at 34 either in the form of a continuous weld or spaced welds. The outer flange of bracket 33 is extended outwardly as at 35 forming a seat to which the transmission may be secured, as will hereinafter appear.

I provide an outer shell 40 preferably of metal and terminating as at 41 (see Figure 1) and on the transverse plane of the outer edge of flange 11. The other end of tube 40 terminates as at 42 which is preferably on a transverse plane with the outer surface of member 35. The insulating material is supplied preferably as follows:

Members 11, 14 and 40, at their front ends, are sealed together preferably by hot poured asphaltum 43, or the like. If insulating material 45 is in position, an annular paper washer 44 is used to prevent the hot material from flowing into the interstices of insulating member 45. Material 45 may fill the space between members 14 and 40 and the space between members 16, 33 and 40 and to a height as indicated by numeral 46. An annular paper washer 47 may be placed on insulating material 45.

Insulating material 48 is then poured in the space between members 26 and 33 to about the height of the top of member 26 and hot asphaltum 49 is then poured to the height as illustrated in Figure 1.

It will be seen by scrutinizing Figure 1 that the refrigerant chamber is completely surrounded by insulating material and that a tube 40 is provided which forms a substantial casing for the device and that a suitable surface is provided to which the transmission may be secured in the following manner:

In Figures 3, 4 and 5 I illustrate a transmission wherein shaft 30 is not needed. The transmission comprises a housing shell 50 having preferably three supporting feet 51 which rest on flange 35. Feet 51 are slightly extended around the outer edge of wall 52 of the housing and extend to the upper face 53 of the housing. Apertures 54 and threaded openings 55 are provided.

A housing cap 56 is provided having openings which register with openings 54. Threaded bolts 57 form a suitable means for securing cap 56 to the housing and the housing to flange 35. A drive shaft 58 is squared at its inner end as at 59 and extends outwardly through a stuffing box 60 provided in the inner wall of housing 50 and extending into a bushing 61 in cap 56.

A relatively large toothed gear 62 is keyed to shaft 58 as at 63. A shaft 64 is rotatably supported in an inner bushing 65 secured to housing 50 and an outer bushing 66 secured to cap 56. Shaft 64 extends through a stuffing box 67 and is adapted, on its protruding end 68, to be secured to preferably a V-drive pulley. The opening in housing 50 made necessary for machining the bushing openings is filled by means of an expansion cap 69.

A pinion 70 is keyed to shaft 64 which operatively engages gear 62. Thus it will be seen that when shaft 64 is turned from the exterior of the housing, shaft 58 will be turned and the end which extends into the freezer chamber will turn the rotor.

By scrutinizing Figures 3 and 4, it will be noted that a narrow space 71 is provided between member 35 and housing 50 so that if there is any leakage from the freezer or gear housing, it will be free to flow by gravity through this narrow opening.

It will be seen that when the screw threads in member 35 are jig positioned and openings 54 for bolts 57 are jig positioned, and that when the housing is secured to member 35, it will always hold the shaft in line with bushing 28. In other words, the housing can be removed and replaced by any ordinary attendant without danger of misalignment.

The surfaces between housing 50 and lid 56 are machine trued as at 72 so a suitable gasket may be provided forming an oil tight joint between these members. Dowel pins 73, one of which is shown in Figure 3, may be provided so lid 56 may be removed and replaced without danger of misalignment of bearing and gears.

In Figure 6, I illustrate a housing having a shaft 80 which is equivalent to the outer end of shaft 58 having at its inner end a hexagon opening 81 adapted for the reception of the hexagon portion 32 of member 30. The remainder of the transmission may be similar to that shown in Figures 3, 4 and 5. The advantages of this construction are that the hexagon joint between shafts 30 and 80 is slightly yieldable so that if shaft 80 should be slightly out of alignment with shaft 30, these shafts would not bind in their bearings.

It will be understood that a double reduction may be provided in the design shown in Figure 6 wherein the transmission is considerably larger than the transmission shown in Figures 3, 4 and 5, in which case the adapter shaft 30 is desirable but not positively necessary.

The double reduction transmission, as in Figure 6, may be very similar to that shown in Figures 3, 4 and 5 except that an extra shaft and gear are required. This double reduction transmission is adapted for the largest freezers. In either event, the designs are too well known to require further description. It will be understood that I may make use of any combination of gears in my device and many minor detail changes may be made in the design of the freezer shell without departing from the spirit and scope of the invention, as recited in the appended claims.

Having thus shown and described my invention, I claim:

1. A device of the class described, comprising a counter freezer shell having an open and a closed end, a concentrically positioned annular bracket secured to said closed end, a gear housing secured to the outer end of said bracket by means of relatively short and small in diameter feet and bolts passing therethrough, a concentrically positioned sleeve secured to said closed end and having an opening, a shaft rotatably mounted in said opening and extending into said shell for operating contact with a mixing rotor, means mounted in said gear housing for driving said shaft.

2. A counter freezer of the class described, comprising a mixing container having a permanent rear end closure, a relatively small in diameter annular bracket secured to the rear of said closure, a gear housing secured to said annular bracket, a drain opening between said bracket and housing, a driving shaft rotatably mounted in said housing, the outer end protruding and adapted for connection to a source of power, a concentrically positioned driven shaft rotatably mounted in said closure and extending into said housing, said shafts having operating connections therebetween and being positioned within said housing.

3. A device as recited in claim 2 including; said last shaft being formed in two pieces and connected together adjacent the gear housing by a detachable and slightly flexible joint.

4. A device of the class described, comprising a cylinder having an open and a closed end, means around said cylinder forming a refrigerant passageway, a cylinder somewhat larger than said passageway, the front end terminating near the transverse plane of said open end and the rear end terminating somewhat past the transverse plane of said closed end, means adapted to bind and seal the ends of said cylinder and passageway together, the intervening space being filled with dry heat insulating material, said means including a concentrically positioned relatively small in diameter annular projection secured to said closed end, the outer end of which is on substantially the same plane as the adjacent end of said second cylinder and forming an annular space adjacent said closed end for said sealing means and dry insulating material.

5. A device of the class described, comprising a cylinder having an open and a closed end, means around said cylinder forming a refrigerant passageway, a cylinder somewhat larger than said passageway, the front end terminating near the transverse plane of said open end and the rear end terminating somewhat past the transverse plane of said closed end, means adapted to bind and seal the ends of said cylinder and passageway together, the intervening space being filled with dry heat insulating material, a sleeve concentrically mounted in said closed end having an opening and a shaft rotatably mounted therein, means on said shaft adapted to form an operating connection to a mixing rotor in said cylinder and to a source of power exterior to the cylinder.

6. A device of the class described, comprising a cylinder having an open and a closed end, means around said cylinder forming a refrigerant passageway, a cylinder somewhat larger than said passageway, the front end terminating near the transverse plane of said open end and the rear end terminating somewhat past the transverse plane of said closed end, means adapted to bind and seal the ends of said cylinder and passageway together, the intervening space being filled with dry heat insulating material, said means including a concentrically positioned relatively small in diameter annular projection secured to said closed end, the outer end of which is on substantially the same plane as the adjacent end of said second cylinder and forming an annular space adjacent said closed end for said sealing means and dry insulating material, a sleeve concentrically positioned in the closed end of said chamber having an opening, a gear housing secured to said annular projection and being supported thereto by means of spaced relatively small projections and holding bolts, a rotatably mounted shaft in said gear housing having a protruding end arranged for connection to a source of power, another rotatably mounted shaft in said gear housing extending into said chamber through the sleeve for contact with a mixing rotor, said shafts having operating connections therebetween.

LOUIS A. M. PHELAN.